United States Patent
Al Ghatta et al.

(10) Patent No.: US 6,447,711 B1
(45) Date of Patent: *Sep. 10, 2002

(54) POLYESTER RESINS HAVING IMPROVED RHEOLOGICAL PROPERTIES

(75) Inventors: Hussain Ali Kashif Al Ghatta, Fiuggi (IT); Arianna Giovannini, Bologna (IT); Sandro Cobror, Pozzilli (IT)

(73) Assignee: Sinco Engineering, S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,741

(22) Filed: Jul. 3, 1996

(30) Foreign Application Priority Data

Jul. 5, 1995 (IT) .......................... MI95A1436

(51) Int. Cl.⁷ .............................. B29B 7/00; B29C 49/06
(52) U.S. Cl. .................... 264/537; 264/328.17
(58) Field of Search .................. 528/272; 264/537, 264/539, 540, 513, 328.17

(56) References Cited

U.S. PATENT DOCUMENTS

| | | |
|---|---|---|
| 4,064,112 A | 12/1977 | Rothe et al. |
| 4,161,578 A | 7/1979 | Herron |
| 4,161,579 A | 7/1979 | Edelman et al. |
| 4,234,579 A | 11/1980 | Barth |
| 4,551,368 A * | 11/1985 | Smith et al. ............ 525/444 |
| 5,243,020 A | 9/1993 | Ghisolfi |
| 5,340,846 A | 8/1994 | Rotter et al. |
| 5,376,734 A * | 12/1994 | Al Ghatta ............ 264/328.1 |
| 5,656,719 A * | 8/1997 | Stibal et al. ............ 264/512 |

FOREIGN PATENT DOCUMENTS

| | | |
|---|---|---|
| EP | 0 222 714 A2 | 5/1987 |
| EP | 0 373 684 | 6/1990 |
| EP | 0 222 714 B1 | 3/1992 |
| EP | 0 712 703 | 5/1996 |
| FR | 2 250 782 | 6/1975 |
| WO | WO 93/08226 | 4/1993 |
| WO | WO 93/23449 | 11/1993 |
| WO | WO 95/02446 | 1/1995 |

* cited by examiner

Primary Examiner—Jan H. Silbaugh
Assistant Examiner—Suzanne E. McDowell
(74) Attorney, Agent, or Firm—Cook, Alex, McFarron, Manzo, Cummings & Mehler, Ltd.

(57) ABSTRACT

Polyester resins particularly suitable for extrusion and injection blow-molding contain from 20 to 1000 ppm of a dianhydride of an aromatic tetracarboxylic acid and show values of die swell less than 45%.

The resins are obtained by solid state polycondensation of resin having intrinsic viscosity less than 0.7 dl/g, added with a dianhydride of an aromatic tetracarboxylic acid in amount between 0.02 and less than 0.05% by weight.

3 Claims, No Drawings

POLYESTER RESINS HAVING IMPROVED RHEOLOGICAL PROPERTIES

BACKGROUND OF THE DESCRIPTION

The present invention relates to polyester resins with improved rheological properties, useful in particular for applications using extrusion blow-molding and injection blow-molding techniques.

The aromatic polyester resins obtained from aromatic bicarboxylic acids and from diols are suitable for the manufacturing of fibre and film, but they do not possess sufficient melt strength to consent to their use in the manufacturing of products by extrusion blow-molding technique.

To increase the intrinsic viscosity and to improve their rheological characteristics, the resins are subjected to solid state polycondensation (SSP) reactions in the presence of polyfunctional compounds that can act as branching agents or as chain extenders. These compounds, apart from improving the polymer rheological characteristics, accelerate the kinetics of the SSP reaction.

Polyfunctional compounds, containing at least three groups capable of reacting with the terminal groups of the resin, act as branching agents. The representative compounds are polyhydric alcohol such as pentaerythritol and trimethylolpropane. Compounds preferably functioning as chain extenders are dianhydrides of aromatic tetracarboxylic acids. Pyromellitic dianhydride (PMDA) is the representative compound. The branching agents bring about in general the formation of gels that limit their use. It has been proposed in U.S. Pat. No. 4,161,579 to use the branching agents in association with the chain terminating agents in order to reduce the formation of gels. However, when utilizing this procedure in the manufacturing of bottles from polyethylene terephthalate (PET) by extrusion blow-molding, the thicker sections of the bottle wall, that is the neck, tend to present opacity which is not acceptable in the field of containers for beverages and cosmetics that have to also satisfy aesthetic prerequisites.

This inconvenience could be eliminated by extruding, in place of PET, polyethylene terephthalate copolymers at content up to ca. 15% of the unit from isophthalic acid (U.S. Pat. No. 4,234,579). The branching agents and the chain extenders are in general used in quantities superior to 0.1% in weight, preferably between 0.1 and 0.3% in weight.

From WO-A-93/234, it is known to use for applications by injection blow-molding limited quantities of polyhydric alcohol, such as pentaerythritol, comprised between 0.007 and 0.08% in moles equal to 0.005/0.057% by weight, if referring to the pentaerythritol molecular weight. This is used with the aim of limiting the formation of gels. Despite the low quantities used, the rate of the solid state polycondensation is still significant. Nevertheless, the melt strength of the resin is not increased. Higher quantities do bring an increase in the melt strength, but correspondingly increase the formation of infusions.

Furthermore, induced crystallization phenomenons are observed with the appearance of opaque areas which are not acceptable for beverage containers. The chain extenders, such as dianhydrides of aromatic dicarboxylic acids and in particular pyromellitic dianhydride, are used in quantities of at least 0.1% in weight. The kinetics of the solid state polycondensation are recognizably increased (U.S. Pat. No. 5,243,020). PET mixtures at the melt state make it possible to obtain bottles by extrusion blow-molding.

However, while PMDA type chain extenders, on one hand bring an increase in the melt strength of resin, on the other hand determine the excessive increase of the elasticity of the melted polymer. This involves a significant slowdown of the extrusion blow-molding operations because of the excessive swelling of the resin at the exit of the mold (die swell).

SUMMARY OF THE INVENTION AND DETAILED DESCRIPTION OF THE PRESENTLY PREFERRED EMBODIMENT

It has now unexpectedly been found that, by using in the solid state polycondensation reaction, quantities of dianhydride of aromatic tetracarboxylic acids having value of less than 0.1% in weight used in the processes of the known technique, it is possible to still obtain significant increases not only in the kinetics of the solid state polycondensation, but also in the melt strength of the polymer such as to consent parison stability, and at the same time not causing a too high level in die swell values.

It has also been found, and this represents an additional aspect of the present invention, that the use of limited quantities of the aromatic tetracarboxylic acid dianhydrides allows significant improvement in the mechanical characteristics (compression and burst resistance, etc.) and barrier properties of the containers obtained by injection blow-molding techniques. The average crystallinity of the PMDA modified PET bottle walls is higher than that of the comparative bottles without PMDA. In the case of bottles and film obtained from PET modified with 4.5% by mols of isophthalic acid and 7.5% by mols of 2,6-naphthalene dicarboxylic acid and 0.05% by weight of PMDA, a crystallinity of up to 60% in the side walls of the bottles and in the film by heat setting the bottles and the film at temperature from 160° to 215° C.

The increase in the mechanical and barrier properties allows the manufacturing of containers with thinner walls which use lower quantities of resin. The dianhydride quantities utilized are less than 0.1% in weight and comprise between 0.1 and 0.015%, preferably between 0.05 and 0.02% of the resin weight. The dianhydrides are added in the preparation phase of the resin by melt polycondensation as well as to the polymer obtained after this phase. The intrinsic viscosity of the resin after the melt state polycondensation is generally inferior to 0.7 dl/g; it is brought to a desirable level comprised between 0.7 and 1.5 dl/g by means of solid state polycondensation.

The preferred dianhydride is pyromellitic dianhydride. Other anhydrides used are dianhydrides: of the following acids: 2,2 bis (3,4 dicarboxyphenyl) propane; 3,3', 4,4'-benzophenone-tetracarboxylic, bis (3,4-dicarboxyphenyl) ether; 2,2-bis (3,4 dicarboxyphenyl) hexafluoro propane, 2, 3, 6, 7-naphthalene tetracarboxylic; 1, 2, 5, 6 naphthalene tetracarboxylic; bis (3, 4-dicarboxyphenyl) sulfoxide.

Belonging to this dianhydride category also are the addition compounds containing two groups of phthalic anhydride obtained by the reaction of 2 moles of dianhydride of aromatic tetracarboxylic acid with one mole alkylene glycol or polyalkylene glycol in particular ethylene glycol and polyethylene glycol or of other composition containing at least two hydroxylic terminal groups.

The solid state polycondensation temperature generally is between 150° and 220° C. The preferred temperatures are between 180° and 220° C.

In the case of copolyesters in which part of the terephthalic acid units are substituted by units deriving from other aromatic dicarboxylic acids, for example isophthalic acid, the reaction temperature at the solid state could be comprised in a range inferior to that mentioned above. The dianhydrides are present in the final polymer, after SSP, in combined form. The resins subjected to the solid state polycondensation reaction are obtained according to known procedures by polycondensation of a diol containing from 2 to 12 carbon atoms with an aromatic bicarboxylic acid or its own ester. Representative diols are ethylene glycol, 1–3 propylene glycol, butylene glycol, dimethylolcyclohexane. Terephthalic acid, isophthalic and naphthalene dicarboxylic acids (2,6 and 2,7-naphthalene dicarboxylic) are preferred. The preferred resins include polyethylene terephthalate and its copolymers in which part of the units of the terephthalic acids are substituted by units from one or more dicarboxylic acids of which isophthalic acid and/or naphthalene dicarboxylic acids can be used in quantities of up to ca. 20% in moles on terephthalic acid. The most preferred resins are PET-ter polymers with 2 to 10% isophthalic acid and with 2 to 10% naphthalene dicarboxylic acids.

The resins thus obtained are subjected to SSP treatment. Before this treatment, the resins undergo a crystallization treatment, according to known procedures so as to eventually reach crystallinity level values sufficiently high in order to avoid phenomenons of packing and/or adhesion of polymer granules on the walls of the SSP reactor.

Equipment and procedures used are described for example in EP-A-222 714, EP-A-373 684, U.S. Pat. No. 4,064,122, U.S. Pat. No. 4,161,578 and in EP-A-712 703, the descriptions of which are herewith incorporated by reference.

The SSp treatment is also carried out in the equipment according to known techniques. For example, the washing gases used in the process are purified according to the process of WO-A-95 02 446, whose description is also incorporated by reference. As already indicated, the dianhydride of the tetracarboxylic acid is incorporated both during the preparation phase of the resin by the melt state polycondensation as well as to the resin already formed. In the first case, it is dissolved in the glycol used for the reaction; in the second case, it is added in the extruder to the melted resin.

The second alternative is preferred. A counterrotating non-intermeshing twin screw extruder is preferably used with average residence time in the extruder inferior to ca. 100 seconds. The granules thus obtained are subjected to crystallization and then solid state polycondensation.

Additives normally used for polyester resins such as stabilizers, dyes, nucleants and others can be added to the resin.

The following examples are provided to illustrate but not to limit the invention.

Comparison Example 1

Bis (2-hydroxethyl) terephthalate (BHET) was prepared from terephthalic acid (TPA) also including a predetermined quantity of isophthalic acid (IPA) and from ethylene glycol (EG) using the ratio EG/TPA of 1.35.

A catalyst was used based on antimony triacetate and cobalt diacetate. In a pressure reactor equipped with stirrer and condenser, the following were loaded:

TPA=4202 g, IPA=121 g (in total 26 moles);

EG=2178 g (35 moles) added in three times respectively EG$_1$=968 g, EG$_2$=605 g, EG$_3$=605 g The catalyst was used in quantities of 2.72 g of Sb and 0.683 g of Co.

The reagents were heated using stirrer between 250° and 270° C. under pressure of 1 bar ca. The BHET obtained had a content of diethylene glycol (DEG) of 1.7–1.8% in weight and of IPA from 2.0 to 2.4% in weight, both not corresponding to the desired values.

Therefore, a second esterification was carried out using one foot of 40% weight (2 kg. of BHET at obtained above) the difference consisted in the monomers.

BHET=2000 ; TPA=2610 g; IPA=126 g;

Sb=1.59 g; Co=0.45; EG=1381 g added at three intervals;

EG$_1$=614 g; EG$_2$=384 g; EG$_3$=384 g.

The DEG content obtained in this second esterification was of 1.39/1.42% in weight; IPA was of 3.00% in weight. The BHET obtained in this manner was polycondensed adding phosphoric acid (0.415 g) equivalent to about 20 ppm of phosphorous on the final polymer. The duration of the polycondensation was of 4 hours operating with an oil temperature of 290° C. and a pressure in the reactor of 2.66 mbar. The polymer was extruded in a bath of water and cut in chips.

The characteristics of the chips are reported in Table 1.

TABLE 1

| | |
|---|---|
| IV (dl/g) = | 0.557 |
| COOH (eq/t) = | 18.25 |
| DEG (% weight) = | 1.5 |
| IPA (% weight) = | 3.1 |
| Sb (ppm) = | 209 |
| Co (ppm) = | 30 |
| P (ppm) = | 15 |

The solid state polycondensation was conducted at 215° C. (203° C. inside the reactor) under stirring and in a stream of nitrogen for a period sufficient to reach an intrinsic viscosity of polymer of 1.076 dl/g. The melt strength (M.S.) values and of the die swell (D.S.) of the chips are here below reported together with the IV values and at the natural logarithm of the constant kinetics of the polycondensation Kin delta IV/h:

| | |
|---|---|
| Kin. delta IV/h = | 9.9 E-3 |
| IV dl/g = | 1.076 |
| D.S. at 1000 s$^{-1}$ = | 18% |
| M.S. (s) at 20 s$^{-1}$ = | 13 |

Examples 1–2

Comparison example 1 was repeated using also pyromellitic dianhydride (PMDA) dissolved in EG used for the esterification.

In Example 1, the quantity in weight of PMDA in the polymer was of 0.01%, and 0.005% in Example 2.

The polycondensation time was about 4 h with an oil temperature of 290° C.

The granules obtained were subjected to solid state polycondensation as in Comparison example 1 using instead a period of time such as to obtain an IV of 1.112 dl/g in Example 1 and of 1.096 in Example 2.

The data on the granule characteristics before and after SSP are reported in Table 2.

TABLE 2

| | Example 1 | Example 2 |
|---|---|---|
| Before SSP | | |
| IV (dl/g) = | 0.604 | 0.607 |
| COOH (eq/t) = | 18.08 | 16.1 |

TABLE 2-continued

|  | Example 1 | Example 2 |
|---|---|---|
| DEG (% weight) = | 1.85 | 1.7 |
| IPA (% weight) = | 2.8 | 2.7 |
| Sb (ppm) = | 245 | 235 |
| Co (ppm) = | 30 | 30 |
| P (ppm) = | 37 | 40 |
| After SSP |  |  |
| Kin delta IV/h = | 1.71 E-02 | 1.50 E-02 |
| IV dl/g = | 1.112 | 1.096 |
| D.S. at 1000 s$^{-1}$ = | 35 | 25 |
| M.S. (s) at 20 s$^{-1}$ = | 26 | 24 |
| Maximum Enthalpy J/g = | — | 3.2 |

Examples 3–4

Example 3 was repeated preparing a polymer containing 0.02% in PMDA weight added with EG, and a polymer without the addition of PMDA.

The polymer not containing PMDA was mixed in the dry state with 0.02% in weight of PMDA and successively in the melt state in the twin screw extruder Haake-Rheomix TW-100. The two polymers were then subjected to SSP at 215° C. under stirring in nitrogen stream for a time sufficient to obtain the desired intrinsic viscosity.

The polymer results before and after SSP are reported in Table 3.

TABLE 3

|  | Example 3 | Example 4 |
|---|---|---|
| Before SSP |  |  |
| IV (dl/g) = | 0.636 | 0.556 |
| COOH (eq/t) = | 20.31 | 35.6 |
| DEG (% weight) = | 1.55 | 1.55 |
| IPA (% weight) = | 2.75 | 2.75 |
| After SSP |  |  |
| Kin. delta IV/h = | 1.74 E-02 | 1.89 E-02 |
| IV (dl/g) = | 1.086 | 1.099 |
| D.S. at 1000 s$^{-1}$ = | 40% | 38% |
| M.S. (s) at 20 s$^{-1}$ = | 31 | 23 |

Comparison Example 2

20 kg/h of PET (IV=0.57 dl/g) were continuously fed from the melt polycondensation section of a pilot plant to a counterrotating non intermeshing twin extruder fitted with a degassing system.

The conditions of the test were:

| screw velocity = | 500 RPM |
|---|---|
| L/D ratio of the screw = | 48 |
| cylinder temperature = | 282° C. |
| melt temperature = | 298–302° C. |
| average residence time = | 35–50 sec. |

The product was extruded in the form of chips with a diameter of 5 mm and 5 mm in length with IV=0.62 dl/g.

The granules were then subjected to SSP in a continuous pilot plant operating as follows:

| chip throughput = | 50 kg/h |
|---|---|
| average temperature of the chips in the reactor = | 203° C. |

-continued

| weight ratio gas/chips in the reactor = | 1:1 |
|---|---|
| final intrinsic viscosity = | 0.808 dl/g |
| Kin delta IV/h = | 5.65 E-4 |

Example 5

Comparison example 2 was repeated with the difference that PMDA was fed in 20% in weight mixture with crystalline PET with a capacity of 40 g/h equivalent to a content of PMDA in the polymer of 0.04% by weight.

The polymer IV, after SSP treatment under the conditions of Comparison Example 2 but using a time of 11.5 h, was of 0.827 dl/g.

Comparison Example 3

The polymer obtained according to Comparison Example 2 having an IV=0.808 dl/g was converted, after drying, in preforms using an injection molding machine BMB 270 according to the following procedure:

| mold = | with 16 pockets |
|---|---|
| preform weight = | 46.9 g |
| cycle time = | 21 sec. |
| screw temperature = | 273° C. |
| feeding time = | 10 sec. |
| injection time = | 5 sec. |
| cooling water temperature = | 3° C. |

The preforms thus obtained were blown to form bottles in a blowing machine Krupp Corpoplast.

The conditions were as follows:

| bottle production = | 6000 bottles/h |
|---|---|
| temperature of heating elements = | 100° C. |
| blowing pressure = | 35 bar |
| bottle volume = | 1500 cc |

The following measurements were conducted on the bottles:

| creep = | 4.67% |
|---|---|
| burst under vertical top load test = | 33 kg |
| burst test = | 11 kg/cm$^2$ |
| compression resistance = | 32N |
| oxygen barrier cc/pack/day = | 0.61 at 25° C. |
| $CO_2$ = | 7.3 at 25° C. |
| average side wall crystallinity = | 24.5% |

Example 6

The polymer in Example 5 was transformed in bottles according to the modalities in Comparison example 3.

The bottles had the following characteristics:

| creep = | 3.5% |
|---|---|
| burst under vertical top load test = | 38 kg |
| burst test = | 14 kg/cm$^2$ |
| compression resistance = | 38N |
| oxygen barrier/day = | 0.55 at 25° C. |
| $CO_2$ = | 6.2 at 25° C. |
| average side wall crystallinity = | 26% |

Analytical Measurement and Determination

Creep

The bottles are filled with water and placed in a device able to operate under pressure and connected to a graduated cylinder. The cylinder was filled with water and put under pressure of 5 bar for 2 minutes. After this the water level is measured in the cylinder, the variation percentage of the bottle volume is calculated.

Burst test

A bottle is placed in an apparatus in order to pressurize it. The necessary pressure to make the bottle burst is measured.

Vertical load test

A bottle is placed between a fixed plate and a mobile one (25 mm/min). The necessary applied force to the mobile plate is then measured in order to bring about crushing of the bottle.

Compression test

The first load at which an increase of deflection occurs without increasing in load is measured.

Analytical measurements

The intrinsic viscosity is measured in a solution of 0.5 g of polymer in 100 cc of 60/40 phenol and tetrachloroethane weight mixture at 25° C. according to ASTM 4603.86. The rheological determination was made using a capillary rheometer Gottfert 2003 operating in nitrogen at 270° C. The samples were dried for 24 h in vacuum at 140° C.

The dye swell measurements were made by cooling in cold water the melted polymer exiting from the capillary at a shear speed of $1000 \text{ s}^{-1}$. The diameter of the polymer string is compared with the diameter of the capillary. The ratio is considered as the dye swell index.

The melt strength was evaluated measuring the time it took the string used to reach a predetermined length (55 cm). This method supplies an indirect measurement of the melt strength and stimulates well the real situation when the material is processed by blow-molding. The aging characteristics are determined using an accelerated procedure consistent in the cooling of the polymer granules from the melt state and in maintaining the same at 60° C. for different times up to 4 days. The samples then undergo a DSC determination with a heating velocity of 10° C./min in the range of the glass transition region. The resulting peak is then considered (relaxation enthalpy).

The pyromellitic anhydride determination was done according to the method described in U.S. Pat. No. 5,340, 846 whose description is incorporated by reference. According to this method, 0.5 g of polymer is added to 20 cc of dimethyl sulfoxide (DMSO) in which is then added 5 cc of sodium hydroxide 5 N in methanol. The mixture is brought to reflux for ½–1 h. It is cooled; 50 cc of deionized water are added to the solution. The determination of the PMDA concentration is effected through high performance liquid chromatography (HPLC) eluting a portion of the neutralized sample across a system of high pressure liquid chromatography (HPLC) using a mobile phase at a gradient concentration formed of acetonitrile and water. The method is calibrated using a standard concentration in known quantities of PMDA.

According to a variant, the PMDA determination as pyromellitic acid is effected through HPLC chromatography using a calibration scale with solutions of 10 mg of pyromellitic acid in 100 ml. of solution 20/5/75 of $DMSO/CH_3OH/H_2O$.

According to another method, the PMDA concentration is determined by the extraction of polymer with ethanol in soxlet for 24 h.

What is claimed is:

1. A process for preparing containers by injection-blow molding of a polyester resin selected from the group consisting of polyethylene terephthalate and copolymers thereof containing from 2 to 10% by mols of units deriving from isophthlalic acid and/or naphthalene dicarboxylic acid, the process comprising the steps of:

melt-mixing the resin with a dianhydride of an aromatic tetracarboxylic acid in an amount between 0.2 and less than 0.05% by weight of the resin;

subjecting the resin to solid state polycondensation until the intrinsic viscosity of the resin is increased to a value higher than 0.7 dl/g; and injection-blow molding the resin to obtain the container.

2. Process according to claim 1 in which the dianhydride is pyromellitic dianhydride and the solid state polycondensation is carried out at a temperature between 150° C. and 230° C.

3. The process according to claim 1 wherein said containers are bottles.

* * * * *